Patented Mar. 5, 1935

1,993,277

UNITED STATES PATENT OFFICE 1,993,277

MANUFACTURE OF RUBBER GOODS

Edward Arthur Murphy and Alfred Niven, Wylde Green, Birmingham, and Douglas Frank Twiss, Erdington, Birmingham, England, assignors to Dunlop Rubber Company Limited, London, England, a British corporation No Drawing. Application May 10, 1932, Serial No. 610,496. In Great Britain May 26, 1931

12 Claims. (Cl. 106—23)

This invention comprises improvements in or relating to the manufacture of goods of or containing rubber.

The object of the invention is to produce goods of or containing rubber from aqueous emulsions or dispersions of the kinds hereinafter specified which have been converted into flocculent or granular precipitates.

According to the invention the process for the production of goods of or containing rubber from aqueous emulsions or dispersions of the kinds hereinafter specified wherein the aqueous emulsions or dispersions aforesaid are converted into flocculent or granular precipitates, comprises effecting the consolidation of the aforesaid flocculent or granular precipitates by filtering or felting operations.

It has been known for some time that instead of the usual adherent type of coagulum, it is possible to obtain rubber as a flocculent precipitate from latex by the use of certain coagulants and by adjustment of the concentration of the latex, as for instance, "Estate Rubber" O. deVries, page 143, 1920.

It has now been found that the flocculent or granular precipitates of rubber can be prepared from rubber latex in a controllable manner and that such precipitated rubber can be used for the production of coherent masses, as for instance, rubber sheet by the employment of filtration or felting operations, such as for instance those employed in paper-cardboard industries.

The aforesaid flocculent or granular precipitates can be prepared from rubber latex in controllable manner by the use of a variety of coagulating agents and methods of coagulation, provided that the coagulation is effected in the presence of a relatively large quantity of water and with or without the presence of a certain amount of colloidal substance found to have a restraining effect upon the coagulation.

The filtering means employed may be of cotton fabric or fine mesh wire gauze.

If desired, suction may be employed to aid filtration and/or pressure may be applied to the filter cake.

After a large proportion of the water has been removed, a compact coagulum is obtained which may be removed and, if desired, molded either in the wet condition or after subsequent drying. Examples of suitable coagulants are acetic acid, sodium silicofluoride, aluminum chloride, potash alum, barium chloride, zinc acetate, zinc sulphate, magnesium acetate, magnesium sulphate, ferrous sulphate, ferric sulphate, nitric acid, hydrochloric acid and sulphuric acid and other mineral acids.

Ordinary compounding ingredients can also be employed in this connection as, for instance, whiting, ball clay and gas black. It has also been found in this connection that such organic materials as trinitrophenol can be used when dissolved, for instance, in benzol.

Examples of substances having a restraining effect on the coagulation are casein, glue and gum acacia, and sodium aluminate. The amount of such substances used also influences the degree of sub-division of the granular dispersion. The degree of concentration has also an influence on the fineness of the precipitate. In general, the lower the concentration, the finer the precipitate.

The aqueous dispersions aforesaid are preferably employed at such dilutions that 100 ccs. thereof contain not more than ten parts of total solids.

By the suitable choice of reagents and conditions of working, granular dispersions of varying consistency can be formed.

If desired, the granular precipitates can be washed free from soluble reaction products such as soluble sulphates or chlorides by known means as, for instance, by filtration and washing prior to their consolidation.

The emulsions or dispersions of rubber or the like comprise those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form. Concentrates such as are obtained in Patent 1,846,164, to which may be added any one or more of the usual known compounding ingredients, may also be employed subsequent to dilution.

The aforesaid vulcanization and/or compounding ingredients which are added in the form of their dispersions may be added to the aforesaid aqueous emulsions or dispersions of rubber, or the like, prior or subsequent to the precipitation of the granular or flocculent coagula.

It is preferable to add the aforesaid dispersions of the vulcanizing and other compounding ingredients before the precipitation of the granular precipitates. In some cases where the precipitate obtained is found to be in a damp, powdery or short paste-like condition before consolidation into a compact, uniform mass, consolidation can be hastened and facilitated by treating the filter cake obtained with a rubber solvent which may be mixed with a mutual solvent for water and the rubber solvent employed, as for instance, alcohol.

It is possible according to the present invention to produce products having mechanical properties ranging from those of soft rubber to vulcanite, by suitable selection and adjustment of the coagulating agents employed. In certain cases it has been found that vulcanizing is unnecessary.

The homogeneous granular precipitates according to this invention can be used for the production of continuous sheet by known felting operations or for bonding granular fibrous or divided material, such as leather fibre, asbestos fibre, wood pulp, wood flour, jute fibre, cotton flock, paper pulp, abrasives and cork.

The aforesaid granular precipitates can also be used for the preparation of compositions containing rubber or similar materials having physical properties resembling those of gutta-percha, which can be used as substitutees for gutta-percha.

The homogeneous granular precipitates according to this invention are also suitable for the manufacture of a large variety of articles, such as boot soles, sheet flooring and treads for tires.

The following are given by way of example showing how the granular precipitates can be obtained. In every case the rubber latex is first diluted so that 100 c. c. thereof contain 4% of total solids.

Example I

Granular precipitates can be obtained by using acetic acid. Ordinary latex or latex produced by centrifugalization is employed.

To 100 ccs. of diluted natural rubber latex 1.6 c. c. of a 5% solution of casein is added. The mixture is then stirred and 4 ccs. of a 10% solution of acetic acid is introduced while the mixture is being stirred, when a fine granular precipitate of rubber is produced. A similar result is obtained when using 100 c. c. of diluted 60% latex produced by centrifugalization if 1.2 c. c. of a 10% solution of acetic acid is added.

Furthermore, if desired, the natural latex and the concentrated latex produced by centrifugalization can be heated to boiling and then cooled prior to the introduction of the casein and the acetic acid.

Example II

Sodium silicofluoride gives granular precipitates with diluted natural latex or diluted concentrated latex produced by centrifugalization.

The addition of 0.8 c. c. of a 5% solution of casein while stirring to 100 c. c. of diluted natural latex and of 1 c. c. of a 20% dispersion of sodium silicofluoride leads to the production of a granular rubber precipitate.

Similarly, the addition while stirring of 4 c. c. of a 5% solution of glue or gum acacia to 100 c. c. of diluted natural latex and the subsequent addition of 0.5 c. c. of a 20% dispersion of sodium silicofluoride leads to the production of a granular rubber dispersion.

The addition of 0.8 c. c. of a 5% solution of casein while stirring to 100 c. c. of diluted concentrated latex produced by centrifugalization, with the subsequent addition of 1 c. c. of a 20% dispersion of sodium silicofluoride during the stirring, also leads to the production of granular rubber precipitates.

A granular rubber precipitate can also be produced if, to 100 ccs. of diluted concentrated rubber latex produced by centrifugalization, 4 cc. of a 5% solution of glue or gum acacia is added, while stirring, with the subsequent addition of 0.4 c. c. of 20% dispersion of sodium silicofluoride.

Example III

Diluted ordinary latex and diluted concentrated latex produced by centrifugalization can be made to give granular precipitates by the use of metallic salts such as aluminum chloride, potash alum, barium chloride, calcium chloride, zinc acetate, zinc sulphate, magnesium acetate, magnesium sulphate, ferrous sulphate, ferric sulphate.

Granular rubber precipitates can be produced from 100 c. c. of diluted natural latex to which 4 c. c. of a 5% solution of aluminum chloride has been added while the mixture is being stirred.

The addition of 1 c. c. of a 5% solution of aluminum chloride while stirring, to 100 c. c. of diluted concentrated latex produced by centrifugalization, also leads to the production of granular rubber precipitates.

Granular rubber precipitates can be produced by adding 12 c. c. of a 5% solution of barium chloride while stirring, to 100 c. c. of diluted natural latex to which previously has been added 4 c. c. of a 5% solution of casein.

Granular precipitates of rubber can also be produced from diluted concentrated latex produced by centrifugalization if, to 100 c. c. of this diluted latex, 2.4 c. c. of a 5% solution of casein is added while stirring, and thereafter 7.2 c. c. of 5% solution of barium chloride. If desired, the latex employed can be of very low ammonia content. This has been found to be particularly desirable when used with zinc sulphate or magnesium acetate.

Example IV

Ordinary compounding ingredients with diluted latex can be made to yield granular precipitates of rubber.

To 100 c. c. of diluted natural or concentrated latex produced by centrifugalization, add 0.8 grams of gas black made into a dispersion with 8 c. c. of a 1% solution of ammonium oleate. The mixture is well stirred. To this mixture add a further 0.4 grams of gas black made into a paste with 4 c. c. of water. After stirring for a few minutes, a granular precipitate is formed.

Example V

To 100 c. c. of diluted natural latex add 8 c. c. of a 5% solution of casein, and then add 10 c. c. of a 5% benzol solution of trinitrophenol, when a granular precipitate of rubber is produced.

Example VI

Mineral acids such as hydrochloric, nitric and sulphuric acids, can also yield granular precipitates with diluted latex as, for instance, to 100 c. c. of diluted natural latex, add 3.2 c. c. of a 5% solution of casein, and then add 1 c. c. of a 10% solution of sulphuric acid. The mixture is well stirred, when a granular precipitate is readily formed.

Granular precipitates obtained according to the above examples are thereafter consolidated by a filtering operation.

The granular precipitate obtained for instance according to the above examples, can be used for example in the preparation of composite rubber sheet consisting of a layer of rubber-leather material and a layer of pure rubber.

For instance, the granular precipitate obtained according to Example I, is mixed with an aqueous dispersion of leather dust in the proportion of 25 parts by weight dry rubber to 75 parts by weight dry leather dust. The mixture is poured uniformly onto a filtering surface which consists of a perforated metal plate over which is placed a sheet of open mesh cotton fabric.

Gentle suction is then applied. When the filter cake commences to consolidate, a layer of the rubber precipitate prepared as described in Example I is then poured over it.

After the filtration has proceeded to a certain point, it will be found that the composite filter cake has become a coherent mass. Pressure may be applied at this stage by means of a hand or mechanically operated press in order to facilitate further removal of water. A molded pattern may also be imparted to the upper surface of the composite sheet by using the plate of the press as a mold, for it has been found that the compacted sheet in the wet condition may be molded sharply and permanently.

The composite sheet is removed from the filter and placed in a dry atmosphere at a temperature not exceeding 40° C. preferably between plates having porous or ventilated surfaces, in order to counteract any tendency for the sheets to buckle during the drying process.

What we claim is—

1. A process for the production of goods of or containing rubber material from aqueous dispersions thereof which comprises converting the dispension into a precipitate, filtering said precipitate to separate the dispersing medium therefrom, treating said precipitate with a rubber solvent in a mutual solvent for water, and compacting said precipitate into a coherent mass.

2. The process of claim 1 in which said mutual solvent is alcohol.

3. A method of forming shaped articles of rubber which comprises coagulating dispersed rubber particles from an aqueous disperson containing not over 10% of dispersed material to form finely divided coagula capable of cohering when filtered, and filtering said coagula to bring the particles of coagula into contact and cause them to adhere to each other thereby compacting said coagula to a coherent rubber mass.

4. The method of claim 3 in which the dispersion comprises substantially natural latex.

5. The method of claim 3 in which suction is applied to said particles during filtering.

6. The method of claim 3 in which casein is present in said dispersion.

7. The method of claim 3 in which coagulation is caused by an acid coagulent.

8. The method of claim 3 in which coagulation is caused by acetic acid.

9. The method of claim 3 in which the percentage of dispersed material is 4%.

10. A method of forming shaped articles of rubber which comprises coagulating dispersed rubber particles from an aqueous dispersion containing not over 10% of dispersed material to form finely divided coagula capable of adhering when filtered, and mechanically separating said coagula from the dispersing medium to bring the particles of coagula into contact and cause them to adhere to each other and thereby compacting said coagula to a coherent mass.

11. A method of forming shaped articles of rubber which comprises coagulating dispersed rubber particles from an aqueous dispersion containing not over 10% of dispersed material to form finely divided coagula capable of adhering when filtered mechanically, separating said coagula from the aqueous medium to bring the particles of coagula into contact and cause them to adhere to each other to form a compact coherent mass, and molding the surface of said compacted mass while still in a wet condition.

12. A method of forming a composite rubber and fibrous sheet which comprises coagulating dispersed rubber particles from an aqueous dispersion containing not over 10% of dispersed material to form finely divided coagula capable of adhering when filtered, mixing a part of said coagula in suspension with a fibrous material, filtering said mixed suspension of fibrous material and coagula to form a consolidated sheet, and filtering onto said sheet as it begins to consolidate the suspended coagula substantially unmixed with fibrous material.

EDWARD ARTHUR MURPHY.
ALFRED NIVEN.
DOUGLAS FRANK TWISS.